(12) United States Patent
Boardman

(10) Patent No.: US 7,174,304 B1
(45) Date of Patent: Feb. 6, 2007

(54) SYSTEM AND METHOD FOR ESTIMATING PRODUCT DISTRIBUTION USING A PRODUCT SPECIFIC UNIVERSE

(75) Inventor: Chris Boardman, Collegeville, PA (US)

(73) Assignee: IMS Health Incorporated, Plymouth Meeting, PA (US)

(*) Notice: Subject to any disclaimer, the term of this patent is extended or adjusted under 35 U.S.C. 154(b) by 1284 days.

(21) Appl. No.: 09/730,266

(22) Filed: Dec. 5, 2000

(51) Int. Cl.
G06F 17/30 (2006.01)

(52) U.S. Cl. ........................................ 705/10
(58) Field of Classification Search .................. 705/10
See application file for complete search history.

(56) References Cited

U.S. PATENT DOCUMENTS

| | | | |
|---|---|---|---|
| 5,420,786 A * | 5/1995 | Felthauser et al. | 705/2 |
| 5,781,893 A | 7/1998 | Felthauser et al. | 705/210 |
| 6,453,246 B1 * | 9/2002 | Agrafiotis et al. | 702/27 |

FOREIGN PATENT DOCUMENTS

JP 11-134390 A * 5/1999
JP 2000-113053 A * 4/2000

OTHER PUBLICATIONS

Berne, Supply Chain Savvy, Food Engineering, Aug. 1, 1999 [GOOGLE].*
Doyle et al., Optimal Growth Strategies for Service Organizations, The Journal of Business, vol. 56, No. 3, Jul. 1983 [JSTOR].*

* cited by examiner

Primary Examiner—Susanna M. Diaz
(74) Attorney, Agent, or Firm—Baker Botts LLP; Manu J. Tejwani

(57) ABSTRACT

A method for estimating the sales of specialty products includes defining a first product specific universe using wholesale purchasing data to determine a product specific store size for a first group of retail outlets. A second product specific universe is defined using sampled retail sales data to determine a product specific store size for a second group of retail outlets, which were not represented in the first group of outlets. Geo-spatial projection is applied to the first and second product specific universes to determine product specific projection factors for retail outlets in the first and second universe. The product specific projection factors are then applied to sampled retail sales data for the product to estimate the sales of said specialty product in unsampled outlets. Preferably, the retail sales data includes prescriber information and the resulting estimates are attributable to individual prescribers authorizing the specialty product sale.

18 Claims, 5 Drawing Sheets

SYSTEM AND METHOD FOR ESTIMATING PRODUCT DISTRIBUTION USING A PRODUCT SPECIFIC UNIVERSE

FIELD OF THE INVENTION

The present invention relates generally to estimating product distribution and more particularly relates to systems and methods for estimating product distribution for specialty products.

BACKGROUND OF THE INVENTION

Manufacturers and distributors of retail products generally monitor product sales in order to maintain proper inventory and to direct marketing efforts. Monitoring may be done by sampling sales at retail outlets and transferring sales data to a central point for evaluation. Retail outlets usually cooperate in providing sales data but a significant number of retail outlets are not able to or do not elect to have sales data sampled in a form needed for analysis. As a result, it is necessary to estimate product sales of unsampled and poorly sampled individual outlets to provide marketing information.

In some industries, distribution of certain products is controlled so that additional data relating to the control of such products is needed for marketing purposes. In the pharmaceutical industry, for example, many products are sold by prescription and such sales are controlled by prescribing physicians. As a result, it is desirable to determine the number of prescriptions written by a physician so that marketing efforts may be directed to the prescribing physicians.

Estimates of business sales in small areas, such as counties of a state, have been made on the basis of known data for the state under the assumption that the relationships for the state also hold for the county. The article "Small-Area Estimation of Economic Statistics" by Cary T. Isaki, Journal of Business and Economic Statistics, Vol. D, No. 4, October, 1990, pages 435–441 describes a ratio correlation (multiple regression) approach for estimating retail sales for small areas (counties) using county-to-state shares of retail sales from two successive economic censuses. While these methods provide estimates of retail sales over a relatively small county area from publicly available data, they are not adapted to estimate retail sales of individual outlets where individual outlet characteristics differ widely. As a result, the estimates for individual outlets based on wide area data are biased and may not reflect actual sales of an individual outlet.

Estimation of physician prescribing activity has been attempted by marketing research practitioners based on ratio estimators and inflation factor estimators as commonly described in such texts as "Sampling Techniques" by W. G. Cochran, John Wiley, New York 1977. These methods attempt to estimate the activity in a pre-established geographic area of known dimensions by scaling up a sample of activity within the area in proportion to the level of a known auxiliary variable (i.e., ratio estimate) or in proportion to the level of sample coverage (via an inflation factor) for the entire area. Typical geographic areas encompass a number of outlets and prescribers. Such geographic-based methods do not yield estimates of each individual prescriber's activity within each individual outlet but only produce a measure of the total activity for the geography. If prescriber level estimates are desired, these methods must assume that the proportion of the total activity that is captured in the sample data (i.e., the captured proportion) of each prescriber is the same. If outlet estimates are desired, it must then be assumed that each unsampled outlet is accurately represented by the average of the sampled outlets in the geography. With these assumptions, all sample data within a stratum receive the same "scale-up" factor. These assumptions, however, are known to be false and result in biased estimates at the activity source level.

U.S. Pat. No. 5,781,893 discloses systems and methods for estimating sales activity of a product at sales outlets including sales outlets at which sales activity data is sampled and unsampled is estimated by determining the distances between each of the sampled sales outlets and each of the unsampled sales outlets and correlating sales activity data from the sampled sales outlets according to the determined distances. The sales activity volume of the product at the sampled outlets and the estimated sales activity volume of the product at the unsampled outlets are combined to obtain an estimate of sales activity for all the sales outlets. Sales activity of products prescribed by a physician at both the sampled and unsampled outlets can be estimated by correlating sales activity data for the prescribing physician at the sampled outlets according to the distances between the sampled outlets and the unsampled outlets. The systems and methods of the '893 patent provide reliable estimates of product distribution when the product has a broad usage base that lends itself to continuous geo-spatial assumptions regarding such product sales. However, in the context of specialty markets, which are defined as products used by specialized consuming populations (e.g., HIV drugs) or products which otherwise require special handling (e.g., such as refrigeration), many assumptions established for broad market estimation are inapplicable. Accordingly, there remains a need to provide a system and method for providing reliable estimates from product sales and distribution in specialty markets.

SUMMARY OF THE INVENTION

It is an object of the present invention to provide a method for estimating retail sales for products in specialty markets.

It is a further object of the present invention to provide a method for estimating retail sales for products in specialty markets using a product specific universe.

In accordance with the present invention, a method is provided for estimating the sales of specialty products. The method employs a two stage approach which includes defining a first product specific universe using wholesale purchasing data to determine a product specific store size for a first plurality of retail outlets and defining a second product specific universe using sampled retail sales data to determine a product specific store size for a second plurality of retail outlets. Geo-spatial projection is then applied to the first and second product specific universes to determine product specific projection factors for retail outlets in the first and second universe. The product specific projection factors are then applied to sampled retail sales data for the product to estimate the sales of the specialty product in unsampled retail outlets.

Preferably, the retail sales data includes an indicia of the authorizing source for the sale, such as a prescribing physician for a specialty pharmaceutical product. In this case, the estimated sales of specialty products can be attributable to the authorizing sources or prescribers.

The first and second product specific universes are preferably non-overlapping groups of stores. In this regard, the first product specific universe generally includes a substantial majority of the retail outlets and the second product specific universe is used to define the product specific universe for the minority of outlets which are not represented in the first product specific universe.

A system in accordance with the present invention includes a computer processor which is operatively coupled to computer storage which maintains a database of wholesale sales data for at least one specialty product and a data base of sampled retail sales data for the specialty product. The processor operates under the control of a computer program which employs a two stage approach to estimate sales of specialty products which includes defining a first product specific universe using data stored in the wholesale sales database to determine a product specific store size for a first plurality of retail outlets and defining a second product specific universe using data from the retail sales database to determine a product specific store size for a second plurality of retail outlets. The processor uses a geo-spatial projection algorithm to determine product specific projection factors for retail outlets in the first and second universe. The product specific projection factors are then applied to retail outlets for which there is sampled retail sales data for the product to estimate the sales of said specialty product in unsampled retail outlets.

Preferably, the retail sales data in the retail sales database includes an indicia of the authorizing source for the sale, such as a prescribing physician for a specialty pharmaceutical product. In this case, the estimated sales of specialty products can be attributable to the authorizing sources or prescribers.

The first and second product specific universes are preferably non-overlapping groups of stores. In this regard, the first product specific universe generally includes a substantial majority of the retail outlets and the second product specific universe is used to define the product specific universe for the minority of outlets which are not represented in the first product specific universe.

BRIEF DESCRIPTION OF THE DRAWING

Further objects, features and advantages of the invention will become apparent from the following detailed description taken in conjunction with the accompanying figures showing illustrative embodiments of the invention, in which.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF PREFERRED EMBODIMENTS

The present system and methods acquire sample data related to a specialty product or specialty market from a number of retail facilities and data reflecting wholesale purchasing data for such products. As used herein, the terms specialty product and specialty market refer to products used by, or directed to, specialized consuming populations, or otherwise require special handling (such as refrigeration) which tend to render broad market assumptions unreliable. The two sets of data are used to generate a product specific universe which is applicable to the specialty product of interest. Product/store specific projection factors are then determined using geo-spatial projection and the projection factors are applied to the universe to establish an estimate of specialty product sales and prescriber activity.

Figure 1:
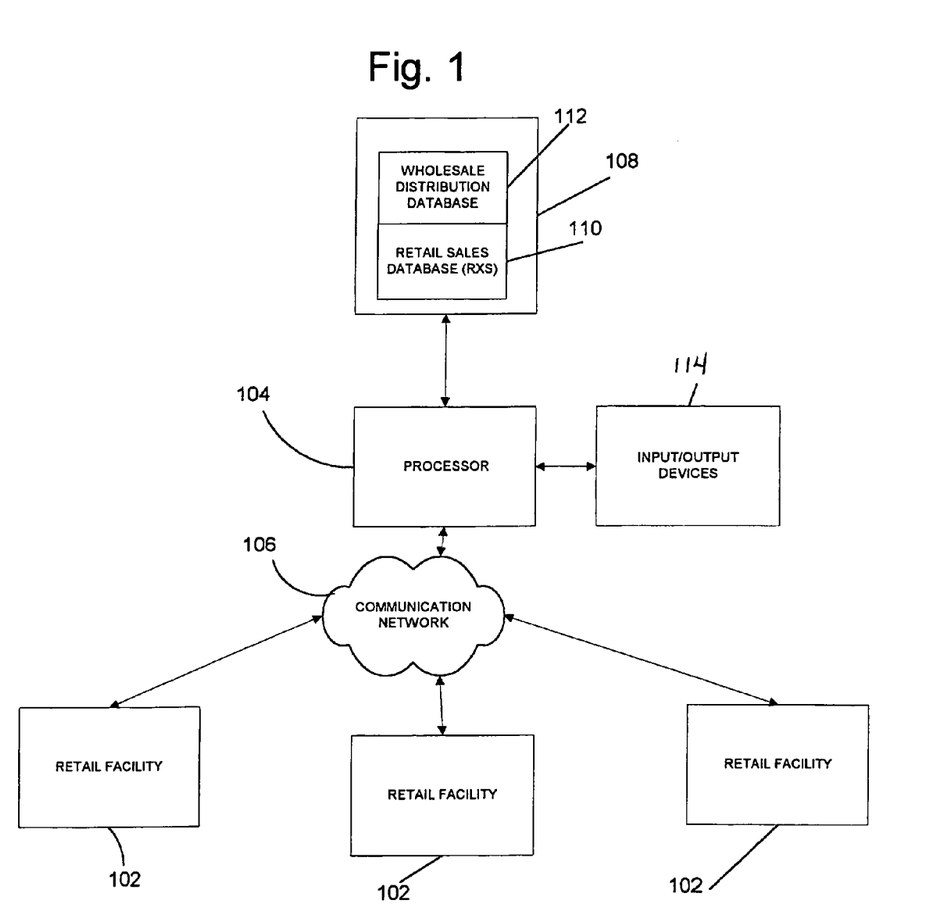
FIG. 1 is a block diagram of a system for performing sales volume estimation in accordance with the present invention.

FIG. 1 is a block diagram illustrating an overview of a system in accordance with the present invention. In the system, a number of retail facilities 102 are coupled to a processor 104 via a communication network 106, such as the Internet. While only three retail facilities 102 are shown, it will be appreciated that an actual system may include thousands of such facilities. Further, the processor 104 can also be distributed to service particular geographic regions or other subsets of the total number of retail facilities 102, if this is desired.

The retail facilities 102 generally use conventional point-of-sale computer systems (not shown) that provide some level of automated data capture for sales information. Regardless of how the sales data are captured, data reflecting sales volume of one or more products is transferred from the retail facility 102 to the processor 104. For pharmaceutical sales, the data provided from the pharmacies generally identifies the physician, or prescriber, who generated the script authorizing the sale. The processor 104 is connected to a large capacity computer data storage system 108 where the sales data provided by retail outlets are stored in a retail sales database 110. A wholesale distribution database 112 is also included to provide data regarding sales from pharmaceutical manufacturers and wholesale distributors to retail distribution outlets. In addition, the system will generally include various input and output devices 114, such as keyboards, digital pointers (e.g., mouse), video displays, printers and the like which are associated with conventional computer systems to provide user interaction with the system.

Figure 2:
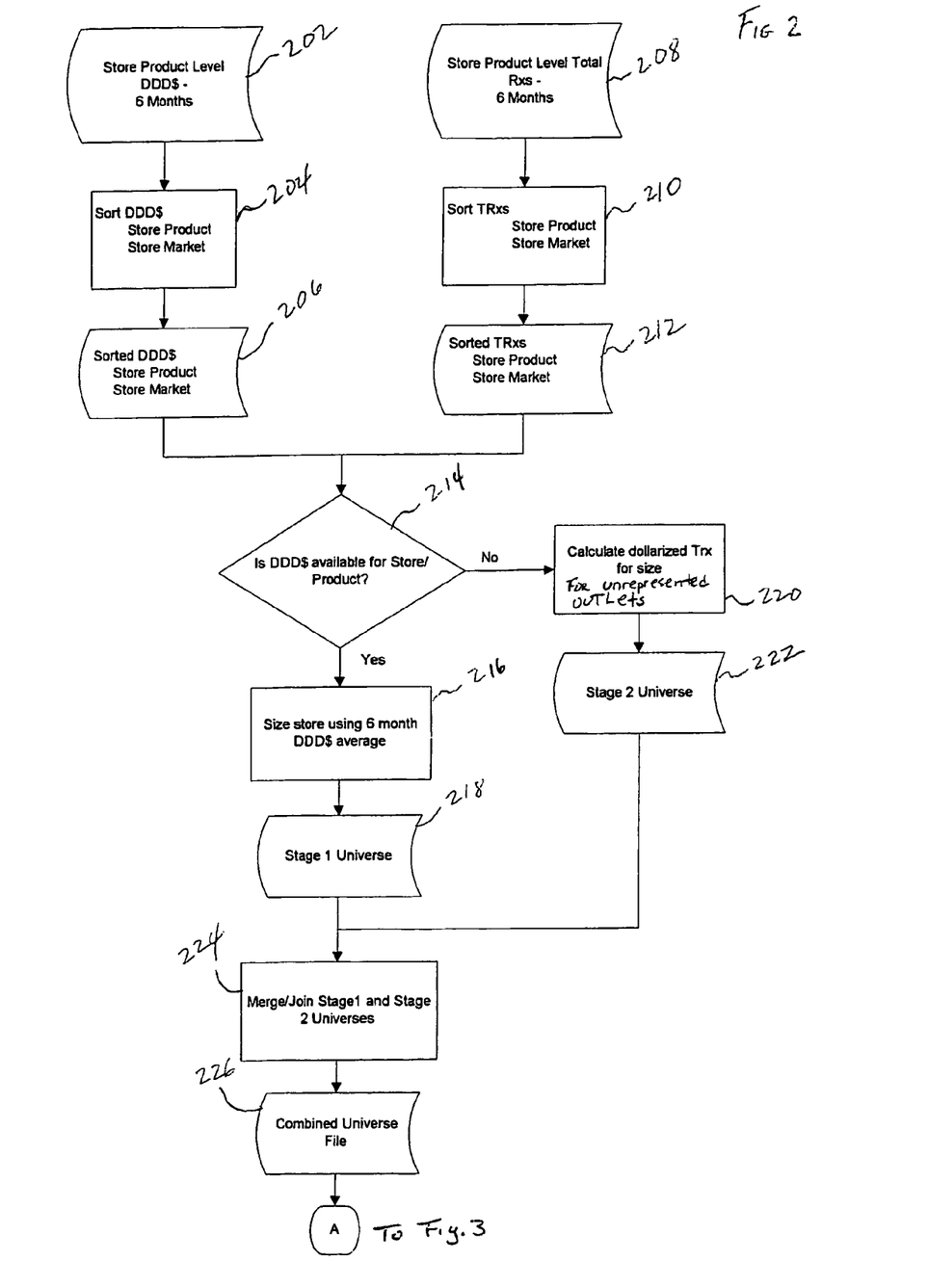
FIG. 2 is a flow chart illustrating the steps in determining a product specific universe for a specialty market.

FIG. 2 is a flowchart illustrating the steps of generating a specific universe for a specialty market in accordance with the present invention. As noted in connection with FIG. 1, the system includes a retail sales database 110 and a wholesale distribution database 112. Referring to FIG. 2, information is stored in the wholesale distribution database 112 in step 202. The data which is stored in the wholesale distribution database are generally acquired from manufactures and wholesale distributors. Such data represents products flow into the retail facilities. This data is generally provided on a regular basis, such as weekly. A suitable database including this data is the Drug Distribution Data (DDD) available from IMS Health, Incorporated or Plymouth Meeting, Pa. In the case of the pharmaceutical industry, such wholesale distribution data can accurately represent approximately 90–95% of purchasing activities by retail pharmacies. However, the wholesale sales data is not directly attributable to a particular prescriber. The wholesale distribution database 112 can be sorted both by product and by geographic market (step 204) and the sorted data are stored (step 206).

As noted above, the wholesale distribution database captures data for over 90–95% of the retail facilities. In order to provide data for the remaining 5–10% of the retail facilities, the retail sales database 110 is used. Data in the retail sales database 110 is provided by a number of retailers which generally provide data over the communication network 106 to the processor 104. The product level and store level sales data are stored in the retail sales database (step 208). For those retail facilities which are not represented by data in the wholesale distribution database 112, data in the retail stores database 110 is used to generate an estimate of wholesale activity. The retail sales data for the sampled stores is sorted by product and market (step 210) and the data is stored in for the particular product and/or market (212).

The wholesale distribution database 112 is the primary source of data used in the present method. If data is available for a particular retail facility and product of interest in the wholesale distributional database 112, this data is used to determine the size of the store over a predetermined time period (steps 214, 216). The term store size as used herein refers to the volume of sales for the specific product of interest. In the case of specialty markets, the store size is highly variable. Even within a particular therapeutic drug class, product sales for individual specialty drugs within the particular therapeutic class are highly variable. For example, a store that sells a large volume of the HIV drug Norvir will not necessarily sell a comparable volume of the HIV drug Crixivan, even though these drugs are in the same therapeutic class. Thus, the present method determines a product specific store size for the retail facilities.

Once the product specific store size is determined in step 216, a stage 1 universe, which includes all stores represented by data in the wholesale distribution database for a particular store and product, are stored (step 218).

Returning to step 214, for those retail facilities where there is no store and product wholesale sales data available in the wholesale distribution database 112, the retail sales database 110 is used to generate a stage 2 universe. Stores which are not represented in the stage 1 universe can be classified in two categories: stores which are represented in the retail sales database and stores which are not represented in either database. For those stores which are not represented in the wholesale distribution database but are represented in the retail sales database, a stage 2 product store universe is established (step 222) using the sampled data averaged over a predetermined time period, such as six months of data having a two month lag from the date of interest. For the unrepresented stores (step 220), an average store size is determined using the sampled data from the retail sales database and this average store size is applied to the unrepresented facilities, which are also included in the stage 2 universe. Preferably, the store size is in the form of an average dollar volume of the product of interest over a predetermined time period, such as six months. The data from the retail sales database generally provides the retail price paid by end users for the product, rather than the wholesale purchase price paid by the retailer. Therefore, to arrive at an average wholesale dollar volume, which is used in the wholesale sales database 112, the unit volume of product sold is determined from the retail sales database and this value is then scaled by an average wholesale price paid by the sampled retailers.

It will be appreciated that the stage 1 universe (step 218) and stage 2 universe (step 222) represent non-overlapping store/product data. To represent the entire universe of retail outlets, the stage 1 universe and stage 2 universe are merged (step 224) and a combined universe file is preferably stored (226).

Figure 3:
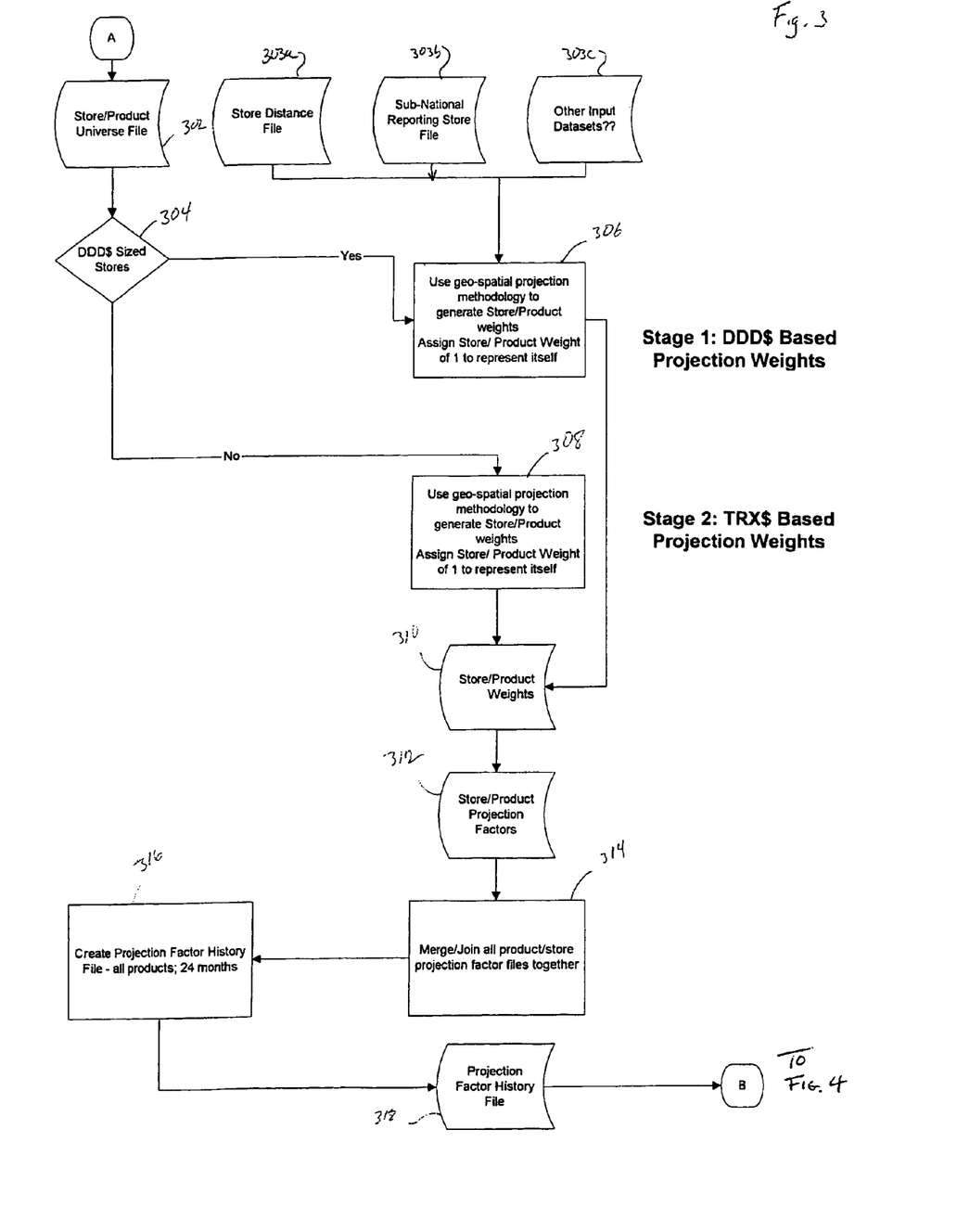
FIG. 3 is a flow chart illustrating the steps in generating estimation projection factors for use in generating estimated sales data for a specialty market.

FIG. 3 is a flowchart illustrating the steps involved in generating projection factors which are used to scale the store/product history data of the combined universe file to generate an estimate of total specialty market sales for unsampled outlets. Data from the combined universe file are read (step 302) from the database and are evaluated to determine whether the sales were from the wholesale distribution database or the retail store database (step 304). The data which is from the wholesale distribution database 112 is applied to a first geo-spatial projection process (step 306) and the data from the retail sales database is applied to a second geo-spatial projection process (step 308). In addition to the data in the stage 1 and stage 2 universe files, the geo-spatial projection processes can also involve data provided by other data files, such as a store distance file 303$a$, a sub-national reporting store file 303$b$ and other such databases 303$c$. In the case of the pharmaceutical industry, the geo-spatial projection process generally assumes that non-sampled pharmacies which are physically close to a sampled pharmacy have similar prescribers for the product of interest.

Figure 5:
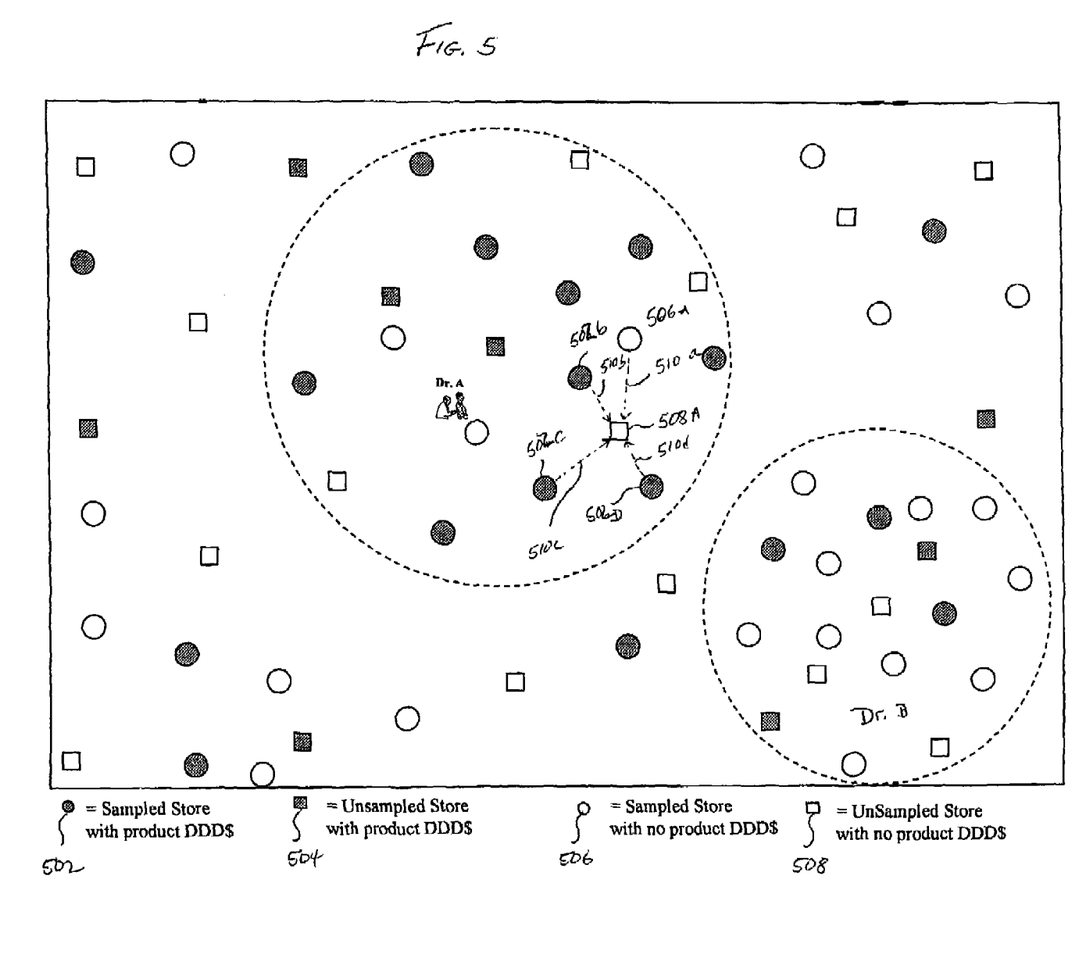
FIG. 5 is a schematic diagram illustrating a geo-spatial sampling model in accordance with the present methods.

In a geo-spatial projection method, such as that which is disclosed in U.S. Pat. No. 5,781,893 to Felthauser, et al. which is hereby incorporated by reference in its entirety, store product weights are assigned by relative store size within a predetermined geographic region. Referring to FIG. 5, which schematically represents retail facilities in geographic regions, the retail facilities can be classified as one of four data types: sampled store with product data from the wholesale sales database 502; unsampled store with product data from the wholesale sales database 504; sampled store without product data from the wholesale sales database 506; and unsampled store without product data from the wholesale sales database (e.g., unrepresented facilities) 508. The geo-spatial projection methods generate statistical estimates of sales and prescriber activity at the unsampled facilities based on the activity of the nearest sampled facilities. For example, the product specific projection factors from sampled facilities 506 $a$ and 502$b$–$d$, weighted in accordance with distances 510 $a$–$d$, respectively, could be used to determine a geo-spatial estimate of product sales for unsampled store 508$a$. These sales estimates can then be attributed to the prescribers in the region of the sampled store.

After geo-spatial station projection is performed on both the data from the wholesale distribution database 112 and the retail sales database 110, store/product weights (step 310) and store/product projection factors (step 312) are stored. The store/product weights represent the relationship between a sampled store and each unsampled store whose sales are projected based on the sample store. The sampled store is assigned a weight of 1. The weights are then aggregated for each sample store to determine the projection factor applicable to that sampled store. The projection factors for each sampled store are preferably stored in a combined projection factor file (step 314). Preferably, a projection factor history file is created (step 316) for all products and these data are also stored in a the projection factor history file (step 318).

Figure 4:
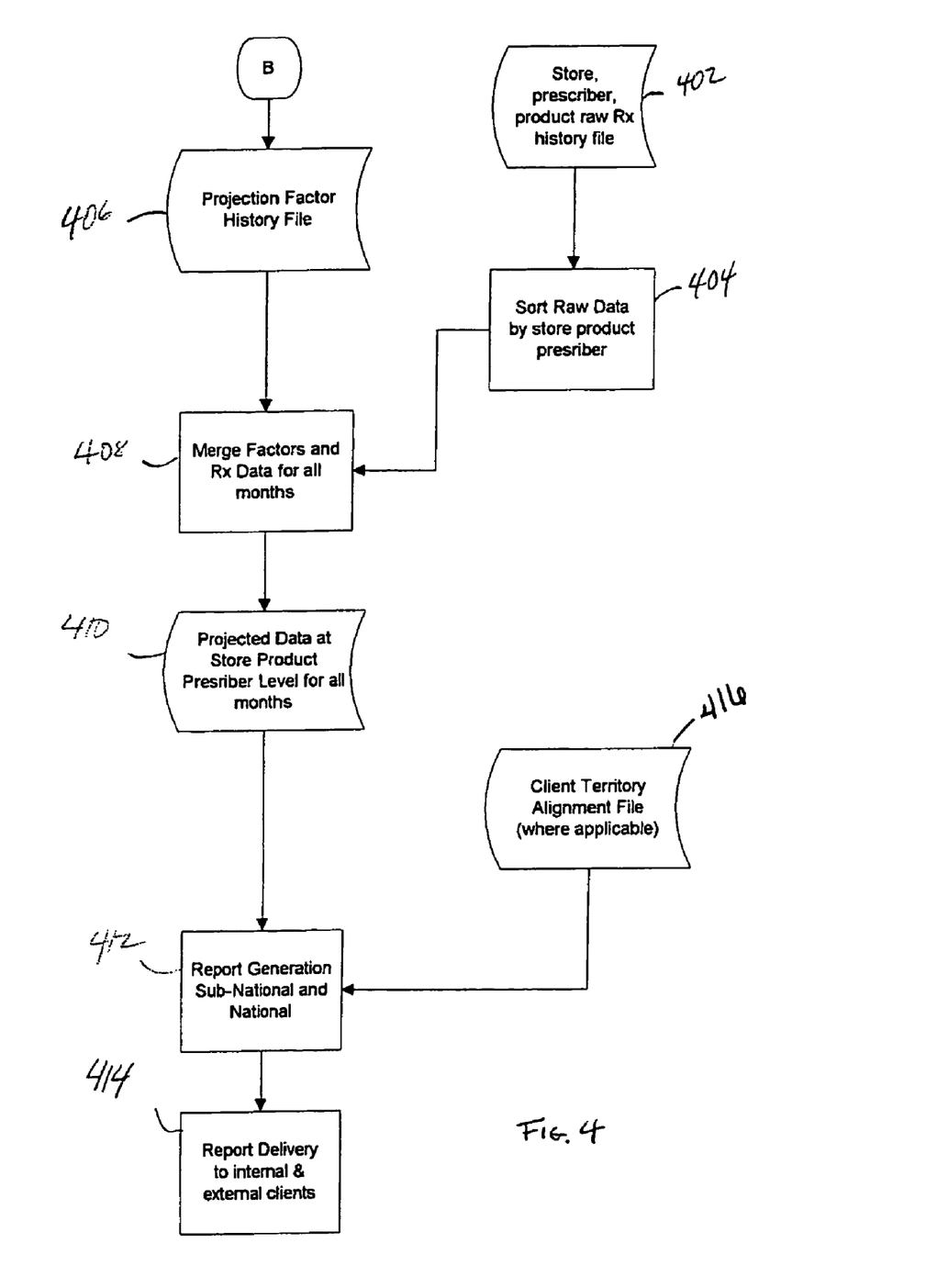
FIG. 4 is a flow chart illustrating the steps in generating projected data reports for specialty markets.

FIG. 4 is a flowchart which illustrates the steps of applying the projection factor file to acquired sales data to generate projected estimates for the prescriber activity in the specialty market and also for generating reports related to this projected prescriber data. As noted in connection with FIG. 1, sampled retailed facilities 102 provide raw data on a regular basis, such as weekly. This data is extracted from the retail sales database, which includes prescriber information associated with the product sales (step 402). These data are sorted by store, product and prescriber (step 404). The projection factors are read from the projection factor history file (step 406) and are applied to the raw data from the sampled stores to arrive at projected product specific prescriber levels for all months of interest (step 408). The projected data, which is the raw data scaled by the applicable store/product projection factor, is preferably stored in the database (step 410). Once the projected prescriber activity level for the product of interest is calculated for the specialty retail market, reports can be generated at national and subnational levels (step 412) using, where applicable a client territory alignment file (step 416). The reports can provide total product activity by a prescriber, as well as trend data from the prescriber. The reports which are generated can then be delivered to internal and external clients via conventional means, such as paper publication or electronic publication via a website, or electronic mail and the like (step 414).

The system and method described above provide for a more accurate estimation of sales of specialty products in unsampled retail outlets. Such sales can be attributed to the source of the sales, which in the case of the pharmaceutical industry is the drug prescriber, who is generally a physician. This prescriber level projection provides important data which can be used in targeted marketing efforts directed to the prescriber. The method uses a product specific universe as the basis for determining store size rather than basing projections based on total store size. The product specific universe provides for a more accurate estimation of the sales of specialty products. To further refine the estimation, the product specific universe is developed in a two stage process, where the first stage is developed from a large database of wholesale purchasing history data for the majority of the retail facilities. For the small number of facilities not represented in the stage 1 universe, a stage 2 universe is developed from sampled retail sales data. The stage 1 and stage 2 universes can be merged to provide a comprehensive product specific universe which is subjected to a two stage geo-spatial projection. From the geo-spatial projections, projection factors are extracted to estimate the prescriber activity at unsampled outlets.

Although the present invention has been described in connection with specific exemplary embodiments, it should be understood that various changes, substitutions and alterations can be made to the disclosed embodiments without departing from the spirit and scope of the invention as set forth in the appended claims.

What is claimed is:

1. A computer readable medium for estimating the sales of specialty products, the computer readable medium comprising instructions operable to perform the steps of:
   defining a first product specific universe using wholesale purchasing data to determine a product specific store size for a first plurality of retail outlets;
   defining a second product specific universe using sampled retail sales data to determine a product specific store size for a second plurality of retail outlets;
   applying geo-spatial projection to the first product specific universe and the second product specific universe to determine product specific projection factors for retail outlets in the first and second universe; and
   applying said product specific projection factors to sampled retail sales data for the product to estimate the sales of said specialty product in unsampled outlets.

2. The computer readable medium of claim 1, wherein said sampled retail sales data identifies an authorizing agent for said sales and wherein the estimated sales are attributable to said authorizing agent.

3. The computer readable medium of claim 2, wherein the specialty products are pharmaceuticals and wherein the authorizing agent is a physician.

4. The computer readable medium of claim 1, wherein the second product specific universe represents retail facilities not represented in the first product specific universe.

5. The computer readable medium of claim 4, wherein the second product specific universe includes unsampled retail facilities.

6. The computer readable medium of claim 5, wherein the unsampled retail outlets are assigned an average product specific store size based upon the sampled retail sales data.

7. A computer readable medium for estimating the prescriber activity for specialty pharmaceutical products, the computer readable medium comprising instructions operable to perform the steps of:
   determining a product specific store size for a first plurality of retail outlets using wholesale sales data;
   determining a product specific store size for a second plurality of retail outlets using retail sales data, said sales data identifying a prescriber who authorized the sales;
   applying geo-spatial projection to the first plurality of retail outlets to determine product specific projection factors for the retail outlets for which sampled retail sales data is available;
   applying geo-spatial projection to the second plurality of retail outlets to determine product specific projection factors for the retail outlets for which sampled retail sales data is available;
   applying said product specific projection factors to sampled retail sales data for the product to estimate the total prescriber activity in a region of interest.

8. The computer readable medium of claim 7, wherein the second plurality of retail stores includes retail stores not represented in the first plurality of retail stores.

9. The computer readable medium of claim 8, wherein the second plurality of stores having sampled retail sales data and stores which have no sampled retail sales data associated therewith.

10. The computer readable medium of claim 8, wherein the stores in the second plurality of stores which have no sampled retail sales data are assigned an average product specific store size based upon the sampled retail sales data.

11. The computer readable medium of claim 8, wherein the combination of the first plurality of stores and the second plurality of stores represents substantially all of the retail outlets for the specialty product.

12. A system for estimating the sales of specialty products comprising:
   a first database for storing wholesale purchasing data;
   a second database for storing sampled retail sales data;
   a processor, the processor being operatively coupled to said first and second database, the processor:
      determining a product specific store size for a first plurality of retail outlets based on the wholesale purchasing data;
      determining a product specific store size for a second plurality of retail outlets not represented by the wholesale purchasing data;

applying geo-spatial projection to determine product specific projection factors for retail outlets in the first and second plurality of retail outlets for which there is sampled retail sales data; and applying said product specific projection factors to sampled retail sales data for the product to estimate the sales of said specialty product in unsampled outlets.

13. The system for estimating the sales of specialty products according to claim 12, wherein the second plurality of retail stores includes retail stores not represented in the first plurality of retail stores.

14. The system for estimating the sales of specialty products according to claim 13, wherein the second plurality of stores include stores having sampled retail sales data and stores which have no sampled retail sales data associated therewith.

15. The system for estimating the sales of specialty products according to claim 14, wherein the stores in the second plurality of stores which have no sampled retail sales data are assigned an average product specific store size based upon the sampled retail sales data.

16. The system for estimating the sales of specialty products according to claim 15, wherein the combination of the first plurality of stores and the second plurality of stores represents substantially all of the retail outlets for the specialty product.

17. The system for estimating the sales of specialty products according to claim 12, wherein said sampled retail sales data identifies an authorizing agent for said sales and wherein the processor attributes the estimated sales to said authorizing agent.

18. The system for estimating the sales of specialty products according to claim 17, wherein the specialty products are pharmaceuticals and wherein the authorizing agent is a physician.

* * * * *